March 16, 1943. S. E. HILBLOM 2,314,216
CONTROL MEANS FOR AGRICULTURAL IMPLEMENTS
Filed Jan. 2, 1942 2 Sheets-Sheet 1

Inventor:
Samuel E. Hilblom.
By Paul O. Pippel
Atty.

March 16, 1943. S. E. HILBLOM 2,314,216
CONTROL MEANS FOR AGRICULTURAL IMPLEMENTS
Filed Jan. 2, 1942 2 Sheets-Sheet 2

Inventor:
Samuel E. Hilblom.
By Paul O. Pippel
Atty.

Patented Mar. 16, 1943

2,314,216

UNITED STATES PATENT OFFICE 2,314,216

CONTROL MEANS FOR AGRICULTURAL IMPLEMENTS

Samuel E. Hilbiom, Chicago, Ill., assignor to International Harvester Company, a corporation of New Jersey Application January 2, 1942, Serial No. 425,405

16 Claims. (Cl. 56—25)

This invention relates to an agricultural implement, and, more particularly, to an agricultural implement of the mower or harvester type.

The invention is concerned primarily with the provision of control means for the cutting mechanism of a mower. Most mowers of the type to which the invention may be adapted are represented generally by that form of mower which consists of a supporting frame which carries the cutting mechanism. The cutting mechanism extends laterally from the supporting frame in a normal operating position and includes a cutter-bar for harvesting the crop at one side of the supporting frame. In mowers of the type connected to or carried on tractors or other vehicles it is a common expedient to mount the cutter-bar for releasable rearward swinging movement horizontally with respect to the supporting frame when the cutter-bar strikes an obstruction in the field. The purpose of this expedient is to eliminate the possibility of damage to the cutting mechanism, such means being more common in connection with tractor-drawn or tractor-connected mowers because of the high speed at which the mower is operated. Releasable means are provided for maintaining the normal operating position of the cutter-bar, this means being releasable upon excess pressure applied to the cutter-bar when it strikes the obstruction.

One of the principal problems arising in connection with the use of a mower of the type referred to is that involving the restoration of the cutter-bar to normal position after it has been released. Various forms of releasable means have been devised which permit automatic reconnection of the cutting mechanism upon reversing the tractor, after which the cutting mechanism can be raised until the obstruction is passed over. In connection with the release of the cutting mechanism from operating position, there is also involved the problem of accommodating the driving mechanism to the cutting mechanism, which drive usually takes the form of a telescopic or disconnectable drive shaft arrangement associated with the power take-off shaft of the tractor. Various forms of devices have been worked out to provide for an efficient and automatic restoration of the driving arrangement upon reconnection of the cutter-bar and restoration thereof to operating position.

The discussion of the foregoing problems is believed to render clear an appreciation of the problem which the present invention solves. In a mower of the type described there must necessarily be provided means for raising and lowering the cutting mechanism so that the height of cut may be regulated. This means is additionally necessary for the purpose of moving the cutter-bar vertically from operating position to transport position in which latter position the cutter-bar extends vertically at one side of the supporting frame. The ordinary lifting and lowering means is not satisfactory for use in a mower of this type, since the connection between that means and the cutting mechanism must be broken when the cutting mechanism swings rearwardly after striking an obstruction. One form of connection heretofore used is that in which the lifting connection is completely separable from the cutting mechanism or the lifting means upon rearward swinging of the cutting mechanism. However, this arrangement is not satisfactory because the complete separation requires that the operator dismount from the tractor in order to reconnect the parts for continued operation. Inasmuch as the other releasable elements of the mower construction, such as the releasable means and the releasable driving mechanism referrd to above, are substantially automatic in operation upon reconnection, it will be seen that a lifting connection which requires manual reconnection materially detracts from the efficient operation of the entire mower.

It is, accordingly, the principal object of the present invention to provide a lifting means for a mower or agricultural implement which is capable of release and automatic reconnection.

It is an important object of the present invention to provide a lifting connection which is not completely separable or disconnectable, the connection thus including means serving to limit relative horizontal swinging movement between the cutting mechanism and the supporting frame.

The invention seeks as another object to provide means which remain connected both during rearward swinging of the cutter-bar and during operation of the controlling or lifting means for adjusting the cutting mechanism vertically.

The invention seeks, as an additional object, to provide a means which may be adapted to any form of agricultural implement in which one part is carried by another part for relative movement through a plurality of ranges.

Other objects and features of the invention will appear in greater detail as the following description is made of a preferred form of the invention as applied to a tractor-connected mower of a well known type.

In the drawings,

Figure 3 is a plan view of the structure shown in Figure 1.

Figure 1:
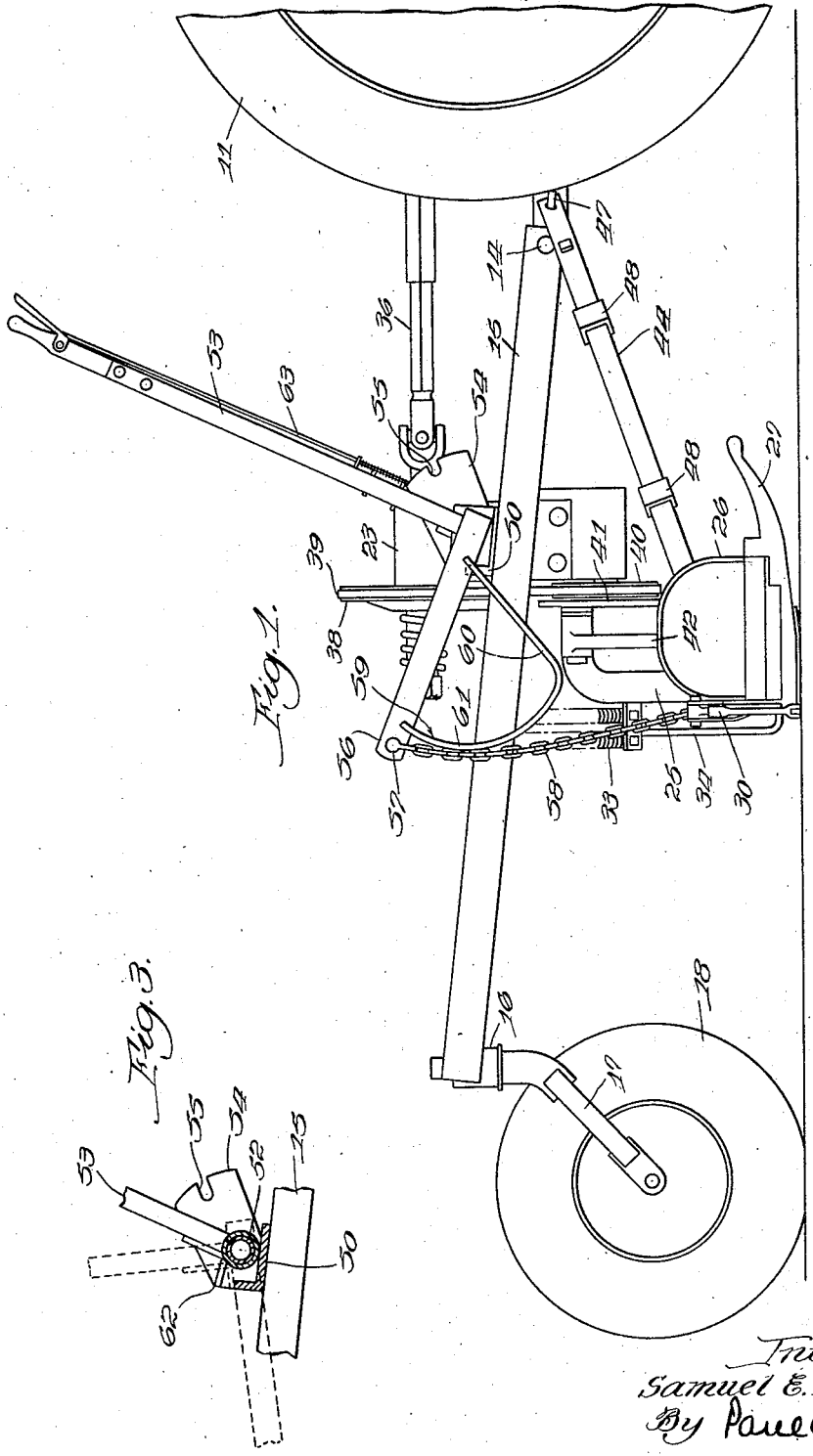
Figure 1 is a side elevational view of a tractor-connected mower embodying therein a preferred form of the invention.

The agricultural implement structure chosen for the purposes of illustration is a tractor-connected mower. As shown in the drawings, only the rear portion of a tractor is illustrated, the reference character 10 denoting the tractor body and the numeral 11 denoting one of the rear drive wheels of the tractor. The tractor includes or is provided with a frame structure, such as a draw-bar 12, which carries at laterally spaced points thereon a pair of connecting brackets 13. By means of transverse pivot pins 14, only one of which is shown, these brackets serve to connect to the tractor a mower main frame 15. This frame consists of a pair of rearwardly diverging side frame members connected at their rear ends by a bracket 16 which serves as a bearing for the yoke 17 of a caster wheel 18. The mower frame 15 is thus supported between the caster wheel 18 and the draw-bar 12 of the tractor.

The frame 15 is provided with a pair of transversely extending, longitudinally spaced brace members 19 and 20. The left-hand frame member and the brace member 20 rigidly carry therebetween a support 21. The support carries a vertically disposed hinge pin or pivot member 22 on which is mounted a housing 23. The housing 23 includes a depending portion providing a longitudinal bearing 24 for the inner end of a coupling bar 25. The coupling bar extends to the right-hand side of the frame and carries at its outer or grassward end a conventional yoke structure 26. The yoke is provided in the usual manner with a shoe 27 which in turn carries a cutter-bar 28 and reciprocating knife or sickle 29. The cutter-bar and yoke carry conventional gag lever mechanism, generally indicated by the reference numeral 30, which serves to raise and lower the cutter-bar about the horizontal hinge pin connection between the yoke 26 and the shoe 27, all of which may be conventional construction. The left-hand frame member 15 carries a rearwardly extending bracket 31 connected at its rearward end to a threaded rod 32, which is in turn connected by a pair of tension springs 33 to a link 34 associated with the gag lever mechanism 30. This mechanism functions in the usual manner to aid in lifting the cutting mechanism.

The housing 23 previously described journals a longitudinally extending shaft 35. The forward end of the shaft is connected by telescopic shafting 36 to a power source on the tractor, such as a power take-off shaft 37. The rear end of the shaft 35 carries a pulley 38 which drives a belt 39 trained about a smaller pulley 40 carried by the depending portion of the housing 23. The pulley 40 is preferably formed integral with an eccentric or crank 41 which is connected by a usual pitman 42 to the knife or sickle 29. It will be understood that the driving mechanism just described may be replaced by any suitable driving mechanism.

Figure 2:
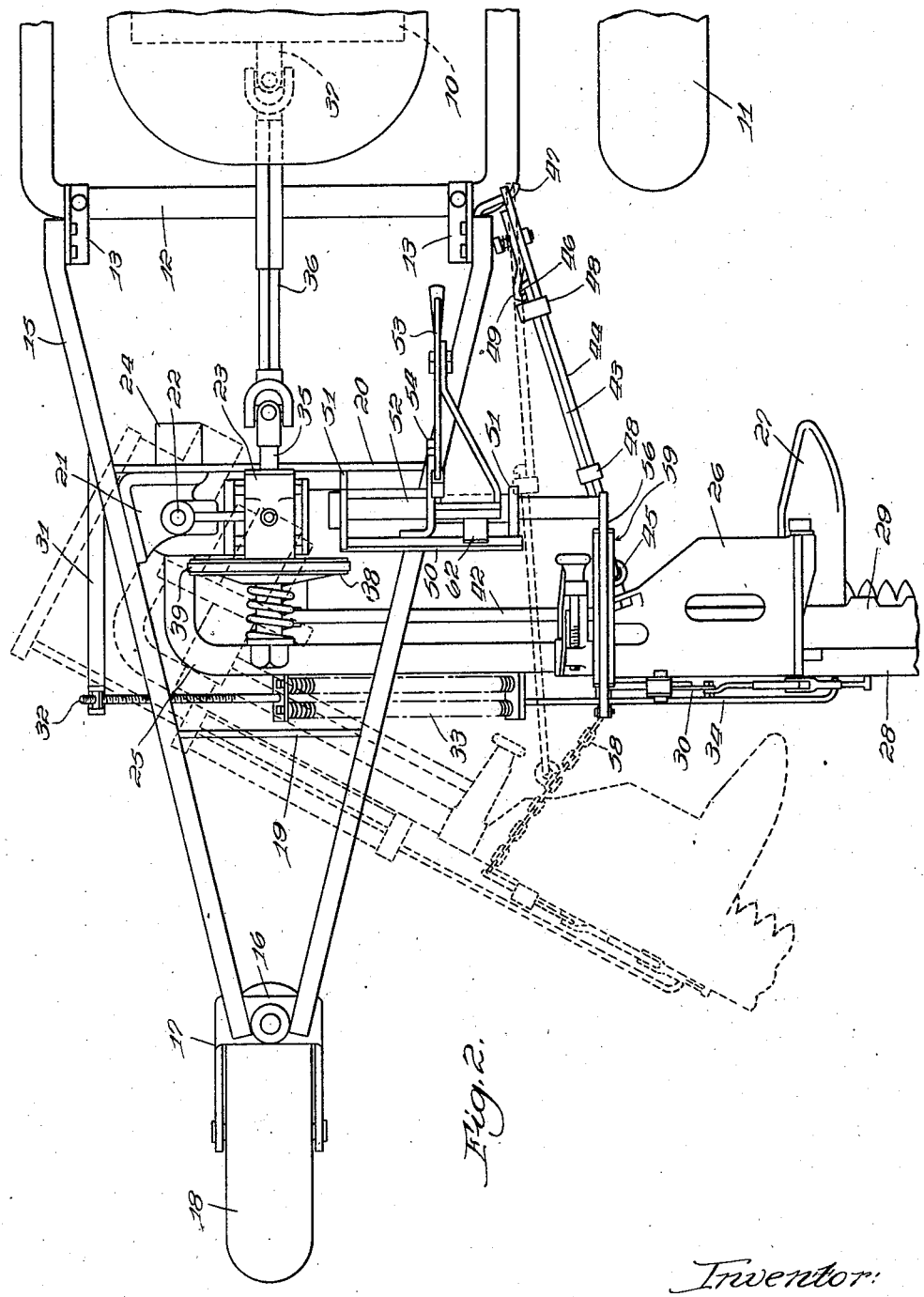
Figure 2 is a view of portions of the lifting mechanism, the figure further illustrating in broken lines the downward positions of the lifting lever and arm.

During normal operation of the mower, the cutting mechanism extends laterally at the right-hand side of the tractor and mower frame. Because of the hinge or pivot pin 22, the cutting mechanism is connected to the mower frame for movement with respect to the mower frame through a range defined generally as rearward swinging movement. This arrangement is provided for the purposes of enabling the cutting mechanism to be released in the event that the cutter-bar strikes a hidden obstruction, thus preventing damage to the parts. For the purpose of normally retaining the cutting mechanism in operative position, there is provided releasable means, preferably consisting of a pair of telescopic or extendible bars 43 and 44. The bar 43 is connected, as at 45, to the yoke 26 and has its forward end provided with a lug 46. The bar 44 is connected at its forward end, as at 47, to a forward portion of the right-hand frame member of the mower frame 15. The bars 43 and 44 lie normally side-by-side and are retained for relative sliding movement by a pair of spaced collars 48. The forward portion of the bar 44 carries a spring pressed detent member 49, which normally engages the lug 46 on the bar 43. When continued forward movement of the cutting mechanism is opposed by an obstruction overcoming the tension on the detent or locking means, the lug 46 separates from the member 49, and the cutting mechanism swings rearwardly about the hinge pin 22 on the bracket 21. This disposition of the rearwardmost collar 48 on the member 44 may be such as to engage the lug 46 on the member 43 to limit the rearward swinging movement of the cutter-bar. This will be clear from an examination of the position of the cutting mechanism and the related parts, as shown in broken lines in Figure 2.

The mower construction just described is representative of usual mower constructions in which the cutting mechanism is releasably held in normal operative position and in which the cutting mechanism may have rearward swinging movement upon the striking of an obstruction. As previously stated, one of the main problems in the design and construction of an efficient mower is the problem involving the connection between the cutting mechanism and the control means for raising and lowering the cutting mechanism. According to the present invention, this problem is eliminated by the provision of a novel and simplified control means having a lifting connection that remains connected during both rearward swinging movement of the cutting mechanism and vertical movement of the cutting mechanism as adjusted by the lifting or control means.

The frame 15 carries a transversely extending support, preferably in the form of an angle bar 50 (Figure 3). Each end of the bar 50 carries an upstanding bracket portion 51, and these portions serve to journal a transverse rock-shaft 52. This rock-shaft rigidly carries an upstanding control lever 53. A quadrant 54 is rigidly carried by the supporting bar 50 and is provided with a single locking notch 55, the purpose of which will presently appear. The structure just described provides a member rockably carried by the mower frame 15 for moving the cutting mechanism vertically.

The outer end of the rock-shaft 52 carries rigidly thereon a rearwardly extending arm 56. The rearward end of this arm is connected, as at 57, to a downwardly extending means, such as a lifting chain 58, the lower end of which is permanently connected to the gag lever mechanism 30. The connection 57 between the arm 56 and the flexible element 58 is likewise permanent or fixed. The length of the chain 58 is such as to permit the necessary rearward swinging movement of the cutting mechanism upon release upon striking of an obstruction. Since the quadrant 54 contains only the notch 55, the rockable means consisting of the rock-shaft 52, lever 54, and arm 56, may have free rocking movement with respect to the frame 15. It will be noted that this movement is downwardly and rearwardly, or toward the direction of swinging of the cutting mechanism.

Although the length of the chain 58 is desirable from the standpoint of providing for free rearward swinging of the cutting mechanism, it is found that the length of the chain prevents efficient operation of the control or lifting mechanism principally because the rockable means must be rocked through quite an extensive arc before a lifting effect is had on the gag lever mechanism 30. According to the present invention the rockable means is provided with means for temporarily shortening the chain 58 for the raising and lowering of the cutting mechanism. A preferred form of such means is illustrated as comprising a member 59 secured at one end to the forward portion of the arm 56. This member includes a downwardly and rearwardly extending portion 60, which thence continues into an integral arcuate portion 61. The upper end of the arcuate portion is rigidly secured to the rear end of the arm 56 adjacent the connection 57 between the arm and the chain 58. It will thus be seen that, upon rocking of the rock-shaft 52 forwardly to raise the cutting mechanism, the arcuate portion 61 of the member 59 engages the chain 58 intermediate its points of connection with the arm 56 and the gag lever mechanism 30. This means thus provides for a shortening of the chain 58 and increases the effective lever arm between the rocking axis of the rock-shaft 52 and portions of the member 59. The member 59 may be alternately spoken of as an additional arm carried by the rock-shaft for the purpose of engaging the chain 58 upon operation of the lifting or control means.

As best shown in Figure 3, lifting lever 53 carries at its lower end a stop member 62. As shown in broken lines in the figure referred to, the member 62 is adapted to engage the upper transverse edge of the support or angle bar 50. Engagement between these two parts thus limits the rearward swinging of the rockable means, and this in conjunction with the permanent connection between the ends of the chain 58 and the arm 56 and cutting mechanism provides an effective means for limiting rearward swinging of the cutting mechanism, in which case the stop means on the release bars 43 and 44 may be omitted. When the lifting mechanism has been operated to the desired extent to raise the cutting mechanism, the notch 55 in the quadrant 54 may be engaged by detent means 63 on the lever 53, all of which is generally conventional construction.

The operation of the mower and the release of the cutting mechanism and the functioning of the lifting or control means should be apparent from the foregoing description. It will be appreciated that the construction described represents only a preferred form of the invention and that the control means may be similarly applied to any form of agricultural implement in which a movable part is disposed for movement through different ranges.

It will be also appreciated that further alterations and modifications may be made in the preferred construction without departing from the spirit and scope of the invention as defined in the appended claims.

What is claimed is:

1. For a mower having a frame, a cutter-bar, means connecting the cutter-bar to the frame for movement upwardly and downwardly with respect to the frame, and means connecting the cutter-bar to the frame for rearward swinging movement relative to the frame from a normal operating position: lifting means for moving the cutter-bar upwardly comprising an arm rockably carried by the frame above the cutter-bar and extending generally rearwardly; a flexible element fixedly connected at opposite ends to the rearward end of the arm and to the cutter-bar, said flexible element being of such length and the arm being rockable downwardly through such a range as to allow substantial rearward swinging of the cutter-bar without a disconnection of said element; and means carried by the arm and extending downwardly and engageable with the flexible element, upon upward swinging of the arm, to shorten the flexible element temporarily for lifting of the cutter-bar by the arm.

2. For a mower having a frame, a cutter-bar, means connecting the cutter-bar to the frame for vertical movement with respect to the frame, and means connecting the cutter-bar to the frame for rearward swinging movement relative to the frame from a normal operating position: control means for moving the cutter-bar vertically comprising an arm rockably carried by the frame and extending generally in the direction of rearward swinging of the cutter-bar; a flexible element fixedly connected at opposite ends to said arm and to the cutter-bar and being of such length as to allow substantial rearward swinging of the cutter-bar; and means operated by the aforesaid arm for temporarily shortening said flexible element upon rocking of the arm to move the cutter-bar vertically.

3. For a mower having a frame, a cutter-bar, means connecting the cutter-bar to the frame for movement upwardly and downwardly with respect to the frame, and means connecting the cutter-bar to the frame for rearward swinging movement relative to the frame from a normal operating position: lifting means for moving the cutter-bar upwardly and including an arm rockable on the frame; a permanent connecting means between the arm and the cutter-bar of sufficient length to allow substantial rearward swinging of the cutter-bar; and means carried by the arm and engageable with the connecting means upon rocking of the arm to lift the cutter-bar.

4. For a mower having a frame, a cutter-bar, means connecting the cutter-bar to the frame for movement upwardly and downwardly with respect to the frame, and means connecting the cutter-bar to the frame for rearward swinging movement relative to the frame from a normal operating position: lifting means for moving the cutter-bar upwardly and including an arm rockable on the frame; a permanent connecting means between the arm and the cutter-bar of sufficient length to allow substantial rearward swinging of the cutter-bar; and means engageable between the arm and the connecting means upon rocking of the arm to lift the cutter-bar.

5. For a mower having a frame, a cutter-bar, means connecting the cutter-bar to the frame for movement upwardly and downwardly with respect to the frame, and means connecting the cutter-bar to the frame for rearward swinging movement relative to the frame from a normal operating position: lifting means for moving the cutter-bar upwardly and including an arm rockable on the frame; a flexible element extending between and fixedly connected at its opposite ends to the arm and to the cutter-bar; and means engageable between the arm and a portion of the flexible element intermediate its ends upon rocking of the arm to lift the cutter-bar.

6. For a mower having a frame including a member rockable thereon, a cutter-bar, means connecting the cutter-bar to the frame for movement upwardly and downwardly with respect to the frame, and means releasably connecting the cutter-bar to the frame for rearward swinging movement relative to the frame: means connected between the cutter-bar and a portion of the frame for limiting rearward swinging of the cutter-bar after the cutter-bar has been released, and means operable by the aforesaid rockable member and engageable with said limiting means to move the cutter-bar upwardly through the medium of said limiting means.

7. For an implement having a frame including a member movable thereon, an implement part, means connecting said implement part to the frame for movement through one range with respect to the frame, and means connecting said part to the frame for movement through a second range relative to the frame: means connected between the implement part and a portion of the frame for limiting the amount of movement of the implement part through the first range, and means operable by the aforesaid movable member and engageable with said limiting means to control movement of the implement part through its other range through the medium of said limiting means.

8. For a mower having a frame, a cutter-bar, means connecting the cutter-bar to the frame for movement upwardly and downwardly with respect to the frame, and means connecting the cutter-bar to the frame for rearward swinging movement relative to the frame from a normal operating position: control means for moving the cutter-bar vertically comprising an arm rockably carried by the frame above the cutter-bar and extending generally rearwardly; a flexible element fixedly connected at opposite ends to the rearward end of the arm and to the cutter-bar, said flexible element being of such length and the arm being rockable downwardly through such a range as to allow substantial rearward swinging of the cutter-bar without a disconnection between the arm and cutter-bar; and means operable by upward movement of the arm and engageable with the flexible element to shorten said flexible element temporarily for raising the cutter-bar.

9. For a mower having a frame, a cutter-bar, means connecting the cutter-bar to the frame for movement upwardly and downwardly with respect to the frame, and means connecting the cutter-bar to the frame for rearward swinging movement relative to the frame from a normal operating position: control means for moving the cutter-bar vertically comprising an arm rockably carried by the frame for movement toward and away from the cutter-bar; a flexible element fixedly connected at opposite ends to the arm and to the cutter-bar, said element being of such length and the arm being rockable toward the cutter-bar through such a range as to allow substantial rearward swinging of the cutter-bar; and means operable by movement of the arm away from the cutter-bar and engageable with the flexible element for moving the cutter-bar upwardly.

10. For a mower having a frame, a cutter-bar, means connecting the cutter-bar to the frame for movement upwardly and downwardly with respect to the frame, and means connecting the cutter-bar to the frame for rearward swinging movement relative to the frame from a normal operating position: control means for moving the cutter-bar vertically comprising a member movably carried by the frame for movement toward and away from the cutter-bar; means connected between the member and the cutter-bar, said means being of such length and the member movable toward the cutter-bar through such a range as to allow substantial rearward swinging of the cutter-bar; and means operable by movement of the member away from the cutter-bar and engageable with the aforesaid means for moving the cutter-bar upwardly.

11. For a mower having a frame, cutting mechanism mounted thereon for vertical and horizontal movement with respect to said frame and releasable means for holding the cutting mechanism normally against horizontal movement: lifting mechanism for controlling vertical movement of the cutting mechanism comprising a control element carried by the frame, means permanently connected at one end to said control element and permanently connected at the other end to the cutting mechanism, said means extending between the control element and the cutting mechanism at a predetermined length and remaining at said length during horizontal movement of the cutting mechanism.

12. For a mower having a frame, cutting mechanism mounted thereon for vertical and horizontal movement with respect to said frame and releasable means for holding the cutting mechanism normally against horizontal movement: lifting mechanism for controlling vertical movement of the cutting mechanism comprising a control element carried by the frame, means permanently connected at one end to said control element and permanently connected at the other end to the cutting mechanism, said means extending between the control element and the cutting mechanism at a predetermined length and remaining at said length during horizontal and vertical movement of the cutting mechanism.

13. For a mower having a frame, cutting mechanism mounted thereon for vertical and horizontal movement with respect to said frame, releasable means for holding the cutting mechanism against horizontal movement: lifting mechanism for controlling vertical movement of the cutting mechanism comprising a control element carried by the frame for movement with respect to the frame, means permanently connected at one end to said control element and permanently connected at the other end to the cutting mechanism for imparting movement to the control element upon horizontal movement of the cutting mechanism.

14. For a mower having a frame, cutting mechanism mounted thereon for vertical and horizontal movement with respect to said frame, releasable means for holding the cutting mechanism against horizontal movement; lifting mechanism for controlling vertical movement of the cutting mechanism comprising a control element pivotally mounted on the frame, means connected permanently at one end to said control element and permanently connected at the other end to the cutting mechanism for imparting pivotal movement to the control element upon horizontal and vertical movement of the cutting mechanism.

15. For a mower having a frame, cutting mechanism mounted thereon for vertical and horizontal movement with respect to said frame, releasable means for holding the cutting mechanism against horizontal movement; lifting mechanism for controlling vertical movement of the cutting mechanism, said means comprising a control element carried by the frame for movement with respect to the frame, means permanently connected at one end to said control element and permanently connected at the other end to the cutting mechanism for imparting movement to the control element upon horizontal movement of the cutting mechanism, and stop means for limiting movement of the control element.

16. For a mower having a frame including a rockable lifting member, a cutter-bar, means connecting the cutter-bar to the frame for movement upwardly and downwardly with respect to the frame, and means connecting the cutter-bar to the frame for rearward swinging movement relative to the frame from a normal operating position: a means connected between the cutter-bar and the frame comprising a flexible element fixedly connected at opposite ends to the cutter-bar and to a portion of the frame, said flexible element being of such length as to allow substantial rearward swinging of the cutter-bar without a disconnection of said element; and means carried by the rockable lifting member and extending downwardly and engageable with the flexible element, upon upward swinging of the arm, to shorten the flexible element temporarily for lifting of the cutter-arm by the arm.

SAMUEL E. HILBLOM.